US008572238B2

(12) United States Patent
Patil et al.

(10) Patent No.: US 8,572,238 B2
(45) Date of Patent: Oct. 29, 2013

(54) AUTOMATED SOCIAL NETWORKING TELEVISION PROFILE CONFIGURATION AND PROCESSING

(75) Inventors: Abhishek Patil, San Diego, CA (US); Xiangpeng Jing, San Diego, CA (US); Dipendu Saha, San Diego, CA (US); Nobukazu Sugiyama, San Diego, CA (US); Ling Jun Wong, Escondido, CA (US); Djung Nguyen, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 430 days.

(21) Appl. No.: 12/589,382

(22) Filed: Oct. 22, 2009

(65) Prior Publication Data

US 2011/0099263 A1    Apr. 28, 2011

(51) Int. Cl.
    *G06F 15/173* (2006.01)
    *G06F 15/177* (2006.01)
    *G06F 15/16* (2006.01)
    *G06F 3/00* (2006.01)
    *H04N 5/232* (2006.01)

(52) U.S. Cl.
    USPC .......... 709/224; 709/220; 709/223; 709/229; 348/211.3; 725/46; 725/110

(58) Field of Classification Search
    USPC .............. 709/220, 223, 224, 229; 348/211.3; 725/46, 110
    See application file for complete search history.

(56) References Cited

U.S. PATENT DOCUMENTS

| 8,230,456 B2* | 7/2012 | Jacoby et al. ............. 725/9 |
| 2005/0160458 A1* | 7/2005 | Baumgartner .............. 725/46 |
| 2007/0266403 A1* | 11/2007 | Ou et al. .................. 725/46 |
| 2009/0293079 A1* | 11/2009 | McKee et al. .............. 725/10 |
| 2010/0146607 A1* | 6/2010 | Piepenbrink et al. ........ 726/7 |
| 2010/0299691 A1* | 11/2010 | Emanuel et al. ........... 725/14 |

FOREIGN PATENT DOCUMENTS

KR    2003-0062157    7/2003

OTHER PUBLICATIONS

"Designing Ubiquitous Personalized TV-Anytime Services," Kazasis et al., Lab. of Distributed Multimedia Information Systems/ Technical University of Crete, Date unavailable.

* cited by examiner

*Primary Examiner* — Ranodhi Serrao
*Assistant Examiner* — Farrukh Hussain
(74) *Attorney, Agent, or Firm* — Miller Patent Services; Jerry A. Miller

(57) ABSTRACT

Content selected by a user of a web access television (TV) device is monitored via a profile controller associated with the web access TV device. Social network aspects of a web access TV user profile are automatically configured based upon the monitored content selected by the user. Social networking opportunities for the user are managed via the web access TV user profile. This abstract is not to be considered limiting, since other embodiments may deviate from the features described in this abstract.

47 Claims, 7 Drawing Sheets

AUTOMATED SOCIAL NETWORKING TELEVISION PROFILE CONFIGURATION AND PROCESSING

COPYRIGHT AND TRADEMARK NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever. Trademarks are the property of their respective owners.

BACKGROUND

Televisions include display units that allow these devices to render visual content. Televisions may access content for rendering by tuning to a channel selected by a user via an input device. Televisions may also download content from a content server in response to a content selection by a user via a web browser or other interface.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which.

DETAILED DESCRIPTION

Figure 1:
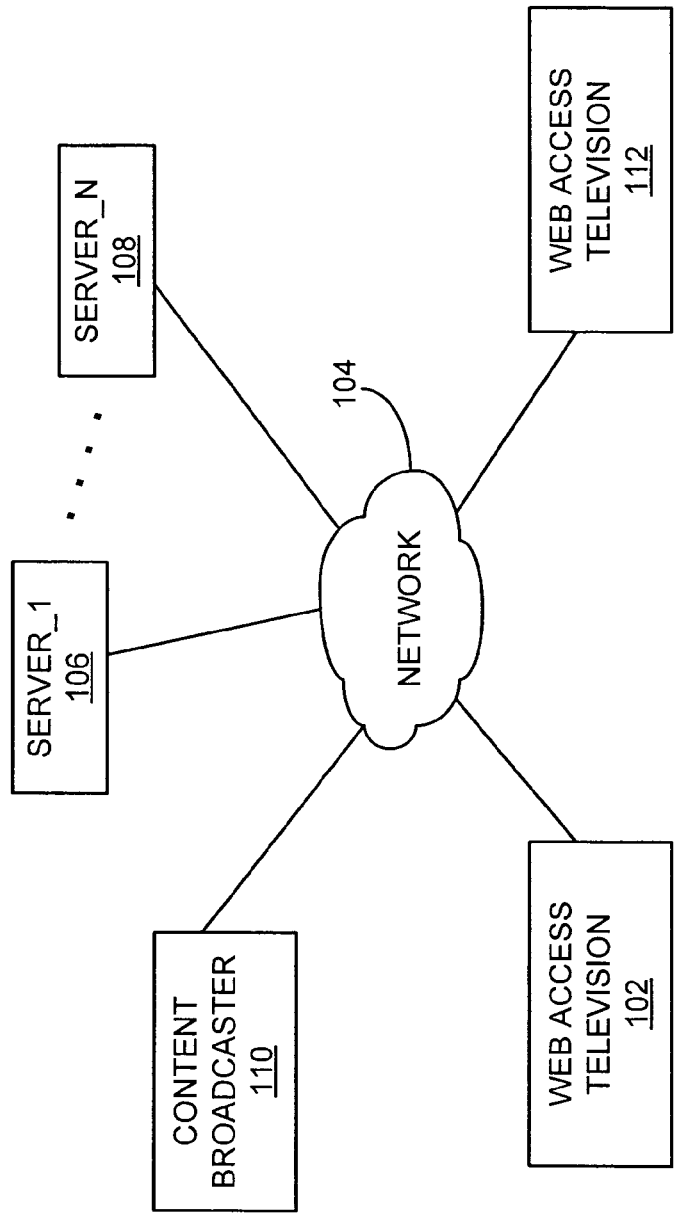
FIG. 1 is a diagram of an example of an implementation of a system for automated social networking television profile configuration and processing consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a function, a procedure, an object method, an object implementation, in an executable application, an applet, a servlet, a source code, an object code, a shared library/dynamic load library and/or other sequence of instructions designed for execution on a computer system having one or more processors.

The term "program", as used herein, may also be used in a second context (the above definition being for the first context). In the second context, the term is used in the sense of a "television program". In this context, the term is used to mean any coherent sequence of audio video content such as those which would be interpreted as and reported in an electronic program guide (EPG) as a single television program, without regard for whether the content is a movie, sporting event, segment of a multi-part series, news broadcast, etc. The term may also be interpreted to encompass commercial spots and other program-like content which may not be reported as a program in an electronic program guide.

Reference throughout this document to "one embodiment," "certain embodiments," "an embodiment," "an implementation," "an example" or similar terms means that a particular feature, structure, or characteristic described in connection with the example is included in at least one embodiment of the present invention. Thus, the appearances of such phrases in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

The terms "content" and "content selections" may include visual content, such as a motion picture, television program, or other content, displayed within a display area of a display device. Such visual content may be from any conventional or unconventional source including, but not limited to broadcast, cable, Telco, Internet, satellite or other sources and may be detected, decoded and/or demultiplexed in any suitable manner to produce a television program viewing-like experience. Visual content may also be downloaded by the web access TV device via a global communications network, such as the Internet, by access to content servers. The terms "content" and "content selections" may also include audible content accessed via any of the above-referenced or additional sources.

The term "web access television (TV) device" refers to a television or other device that includes a display and that can access a global communications network, such as the Internet, to retrieve and/or download content. As such, the term "web access television (TV) device" may include any device that may render content retrieved and/or downloaded from a global communications network, that may search a global communications network for content sources, and that may compile, filter, and otherwise process available content as described in more detail below. Many other variations on a web access TV device are possible and all are considered within the scope of the present subject matter.

The terms "social network" and "social networking" refer to aspects of social interaction related to interests of a user of a web access TV device. For example, a user of a web access TV device may enjoy a particular type, genre, or production period of motion pictures. In such a context, the terms "social network" and "social networking" may include purely social interest opportunities and interactions with other persons. However, the user may also be involved with business activities while interacting with the web access TV device. In such a context, the terms "social network" and "social networking" may include business, business networking, marketing, advertising, and other opportunities and interactions with other persons. As such, the terms "social network" and "social networking," as used herein, refer to any opportunity or interest that a person viewing and interacting with a web access TV device may have with respect to content and interests of other persons that also have access to content via a global communications network.

The present subject matter provides automated social networking television profile configuration and processing. A web access TV device monitors content selections of a user. The web access TV device automatically configures social networking aspects of a web access TV user profile based upon the monitored content selections of the user. The web access TV device manages social networking opportunities for the user via the web access TV user profile.

By automatically configuring the web access TV user profile based upon content selections of the user, the web access TV device may improve automated content search activities for the user, may improve identification of social networking and content access opportunities for the user, and may improve processing and selection of such opportunities by the user. As such, the present subject matter may enhance networking opportunities, such as social networking opportunities, for a user in response to user interactions with a web access TV device.

Monitoring content selected by the user of the web access TV device may include identifying each item of the content selected by the user as one of a set of content types selected from a group, such as network-accessible (e.g., Internet-accessible) content, subscribed content, and broadcast content, among other available forms of content. A content source associated with each item of content selected by the user may also be identified. By identification of content type and a content source, additional processing for automated social networking television profile configuration and processing may be performed.

For example, the content sources accessed by the user may be prioritized within the web access TV user profile based upon a duration of content access for each content source. Additionally, lists of interests of the user may be automatically generated based upon at least one of a topic, a genre, a program rating, and a creation date associated with each item of the monitored content selected by the user.

In such an example context, a network (e.g., Internet) search may be performed for at least one of the topic, the genre, the program rating, and the creation date associated with each item of the monitored content selected by the user. Search results may be received that include at least one of the topic, the genre, the program rating, and the creation date associated with each item of the monitored content selected by the user. Common information within items received via the search results may be identified, and the identified common information may be associated with the web access TV user profile.

Additionally, a network (e.g., Internet) search may be performed for available social network websites with content interest groups similar to the monitored content selected by the user. Search results may be received that include available social network websites with the content interest groups similar to the monitored content selected by the user. A list of the available social network websites with the content interest groups similar to the monitored content selected by the user may be automatically generated and associated with the web access TV user profile. Similar processing may be performed to identify available content that is related to the monitored selected items of content.

Within the context of these examples, social network opportunities may be managed via the web access TV user profile, for example, by presenting the generated list of available social network websites to the user via the web access TV device. A request via an input device to access a selected available social network website may be detected. Access to the selected social network website may be requested from a server associated with the selected social network website in response to the detected access request. An access webpage may be received from the server and the access webpage may be rendered via the web access TV device. As such, automated social networking television profile configuration and processing may be performed based upon user content selections. Similar processing may be performed based upon a generated list of identified common information and based upon a list of available content that is related to the monitored selected items of content.

Within this context, social networking content sources that match at least one of the automatically configured social network aspects for the web access TV user profile may be identified. An alert, such as via an audio and/or video output device, may be generated to indicate that the matching social networking content source exists. In this manner, a user of the web access TV device may accept or decline social networking opportunities based upon the matches identified automatically by the web access TV device. As such, a user request to access the matching social networking content source may be detected, the matching social networking content source may be accessed, and the content associated with the matching social networking content source may be rendered via the web access TV device for the user.

The automatically generated web access TV user profile may also include configuration aspects, such as user preferences for channel/content selection, volume, etc., for a web access TV device. As such, the web access TV user profile may also include web access TV device parameter preferences in addition to social network aspects.

The automatically generated web access TV user profile may be stored on a server accessible via a global communications network, such as the Internet. In such an implementation, the user may move between rooms of a home, or between home and work, for example, and access the stored web access TV user profile from an alternative location. As such, a request via a user input device to access the web access TV user profile stored on the server may be detected, a message may be sent to the server requesting the web access TV user profile, and the web access TV user profile may be received from the server. Viewing preferences for a web access TV device, or for the original web access TV device, and social network aspects associated with user preferences, may be automatically configured for the web access TV device based upon the received web access TV user profile.

Where the web access TV user profile includes content viewing preferences, the web access TV profile may also include preferences with associated available time periods for access to items of preferred content and other user content selection preferences. In such an implementation, in response to activation of the web access TV user profile via the web access TV device, a time and date associated with an access to the web access TV user profile may be determined. An item of preferred content with an available time period associated with the determined time and date based upon the content viewing preferences may be determined from the web access TV user profile. The item of preferred content may be automatically accessed during the available time period via the web access TV device and automatically rendered to enhance the user's content access preference selections. It should be understood that automatically accessing, via the web access TV device, the preferred content during the available time period may include tuning a television receiver to a content source associated with the preferred content, downloading the preferred content from a server, or any other content access approach suitable for a given implementation.

Log records for user content selections may also be stored in association with the automated social networking television profile configuration and processing. In such an implementation, log records may be stored to a database or other suitable storage device. The log records may include, for example, an access time, a duration, and a content identifier associated with access to each item of content selected by the user. This log generation and storage capability may improve guardian (e.g., parental) control of content accessed by another person, such as a minor. In such an implementation, a request may be detected via an input device originated by a guardian of the user to view the log record. The guardian's identity may be verified, such as via a biometric (e.g., facial and/or voice recognition, fingerprint, or other approach) or password-based authentication to verify that the guardian is authorized to view the log record. The log record may be displayed via the web access TV device in response to verification of authority for the guardian to review the log record for the user.

A request may be detected via the input device that is originated by the guardian to change the web access TV user profile. The user web access TV user profile may be changed based upon the request by the guardian to change the web access TV user profile. For example, the guardian may issue a request to limit access to content via the web access TV device for the user. In such an implementation, the social networking opportunities for the user may be managed based upon the changed web access TV user profile, such as, limiting access to content via the web access TV device for the user. The request to limit access to content via the web access TV device for the user may further include a request to block access to the content during a configured time period and/or a configured date. In such an implementation, access by the user to the content during the configured time period and/or the configured date may be automatically blocked by the web access TV device based upon the web access TV user profile. Many other variations on parental or guardian controls are possible and all are considered within the scope of the present subject matter.

Content may also be shared by users, such as via point-to-point connections established between devices, such as web access TV devices. For purposes of the present subject matter, a "point-to-point connection" may be considered as any connection between two devices that allows communication between those two devices. As such, a point-to-point connection may include a direct connection between two devices, a connection between two devices via one or more servers, a connection between two devices via one or more networks, a connection between two devices via a message queuing system to allow a sending device and a receiving device to be operative at different times, or any other type of connection that allows communication between two devices.

In such an implementation via a point-to-point connection, a request to share an item of the content selected by the user via a point-to-point connection with another web access TV device may be detected. The point-to-point connection may be established via a communication device with the other web access TV device, such as over a global communications network. An identifier associated with the item of the content selected by the user and/or the item of the content selected by the user may be sent to the other web access TV device via the communication device. The request to share the item of content may include a request to send an alert to the other web access TV device. The request may be sent to the other web access TV device to generate the alert of the content availability via the other web access TV device. As such, sharing of content selections may be improved among social network opportunities in association with the automated social networking television profile configuration and processing.

Alerts may also be associated with content sources. For example, a stock market price target criterion may be established and an alert generated for the user when the price target criterion is met. In such an implementation, a request may be detected via an input device to associate an alert with a content source and an alert criterion associated with the content source may be added to the web access TV user profile. The content source associated with the alert criterion may be monitored and a determination made when content available via the content source matches the alert criterion. An alert indication via an output device indicating that the alert criterion has been identified via the content source may be generated and the content determined to match the alert criterion may be rendered for the user. This monitoring activity may be performed, for example, by an Internet monitoring widget.

Content sources may be ranked based upon a frequency of access to the content sources and/or a duration of access to the content sources. If multiple preferred content options are associated with a given time period within the web access TV user profile, the preferred content options may be automatically sorted based upon the ranked content sources. The preferred content with the highest ranking may be automatically accessed and rendered via the web access TV device, or the user may be given an opportunity to select from the automatically sorted list.

While the description above provides certain examples for implementation of the present subject matter, it should be understood that many variations of the examples are possible. As such, all possible variations are considered within the scope of the present subject matter.

Turning now to FIG. 1, FIG. 1 is a diagram of an example of an implementation of a system 100 for automated social networking television profile configuration and processing. The system 100 includes a web access television (TV) 102 interconnected via a network 104 with a server_1 106 through a server_N 108 from which content may be accessed and downloaded. The web access TV 102 may also be connected via the network 104 to a content broadcaster 110 for content access purposes. However, it is noted that the web access TV 102 may also be connected to the content broadcaster 110 or any of a plurality of servers, such as server_1 106 through the server_N 108, by satellite connectivity, cable modem, or other interface without departure from the scope of the present subject matter. The web access TV 102 may also communicate with a web access TV 112 (or other web access TV or other communication devices) for content sharing and social networking purposes.

The web access TV 102 may be any device capable of rendering and processing information as described above and in more detail below. For example, the web access TV 102 may include devices such as a television, a personal computer (e.g., desktop, laptop, palm, etc.), a handheld device (e.g., cellular telephone, personal digital assistant (PDA), email device, music recording or playback device, etc.), or any other device capable of rendering and processing information as described above and in more detail below.

The server_1 106 through the server_N 108 provide web and other content that may be accessed by the web access TV 102. As such, the server_1 106 through the server_N 108 represent web servers and other content servers for purposes of the present description.

The network 104 may include any form of interconnection suitable for the intended purpose, including a private or public network such as an intranet or the Internet, respectively, direct inter-module interconnection, dial-up, wireless, or any other interconnection mechanism capable of interconnecting the respective devices. Many other variations of interconnection and communication are possible and all are considered within the scope of the present subject matter.

Figure 2:
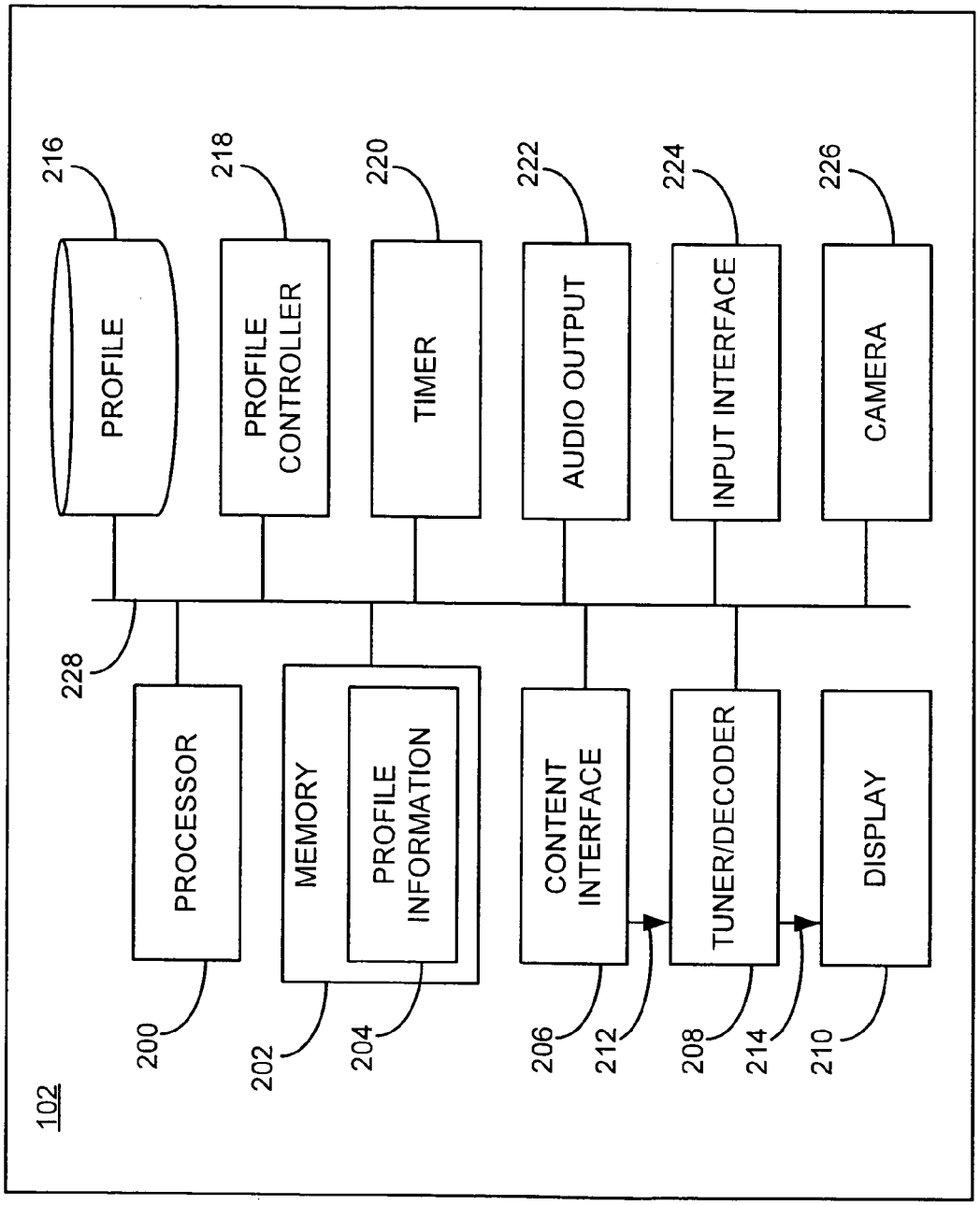
FIG. 2 is a block diagram of an example of an implementation of a web access television (TV) for automated social networking television profile configuration and processing consistent with certain embodiments of the present invention.

FIG. 2 is a block diagram of an example of an implementation of the web access TV 102 for automated social networking television profile configuration and processing. A processor 200 provides computer instruction execution, computation, and other capabilities within the web access TV 102.

A memory 202 includes a profile information storage area 204 that stores information, such as a content selection and other information, associated with processing for automated social networking television profile configuration. It is understood that the memory 202 may include any combination of volatile and non-volatile memory suitable for the intended purpose, distributed or localized as appropriate for a given implementation, and may include other memory segments not illustrated within the present example for ease of illustration purposes. For example, the memory 202 may include a code storage area, a code execution area, and a data area without departure from the scope of the present subject matter.

A content interface module 206 provides communication capabilities for the web access TV 102. The content interface module 206 may include any form of interconnection suitable for the intended purpose, including a private or public network such as an intranet or the Internet, respectively, direct inter-module interconnection, dial-up, wireless, or any other interconnection mechanism capable of interconnecting the web access TV 102 to other components for access to content and information, as describe above and in more detail below. It is also understood that the content interface module 206 may include telephone interconnection capabilities via either wireless or wired carrier, and any other interconnection capabilities for accessing content. The capabilities described above for the content interface module 206 are understood to be within the scope of the present subject matter, but are not described in detail herein for brevity. It is understood that a person of skill in the art will be able to implement such an interface appropriate for a given implementation based upon the description herein.

A tuner/decoder module 208 receives television (e.g., audio/video) content and decodes that content for display via a display 210. The content may include content formatted either via any of the motion picture expert group (MPEG) standards, or content formatted in any other suitable format for reception by the tuner/decoder module 208. It is understood that the tuner/decoder module 208 may include any hardware, programmed processor(s), and memory used to carry out the functions of the tuner/decoder module 208. For example, the tuner/decoder module 208 may include additional controller circuitry in the form of application specific integrated circuits (ASICs), antennas, processors, and/or discrete integrated circuits and components for performing electrical control activities associated with the tuner/decoder module 208 for tuning to and decoding content received either via wireless or wired connections to the web access TV 102. The display 210 may include any display technology capable of rendering content for viewing, such as a liquid crystal display (LCD), light-emitting diode (LED), cathode ray tube (CRT), projection, touchscreen, or other display element or panel.

Two directional connections are illustrated in association with the content interface module 206, the tuner/decoder module 208, and the display 210. A directional connection 212 allows the content interface module 206 to provide received content, such as MPEG encoded content received via IP-based communications to the tuner/decoder module 208 for decoding and rendering via the display 210 (or alternatively, to an output used to drive an external display). A directional connection 214 allows the tuner/decoder module 208 to provide decoded content directly to the display 210 for rendering. As such, content received by the content interface module 206 may be routed to the tuner/decoder module 208 via the directional connection 212 without additional intervention or control by the processor 200. Additionally, content for display via the display 210 may be routed from the tuner/decoder module 208 to the display 210 via the directional connection 214 without additional intervention or control by the processor 200.

It is noted that, though the present example interconnections are described, other interconnections are possible and are considered within the scope of the present subject matter. For example, additional interconnections may be provided to allow the tuner/decoder module 208 to provide closed caption or other information display 210 for rendering. Alternatively, closed captioning or other information may be provided via other connectivity between the modules described below and as illustrated within the present example.

A profile database 216 provides storage capabilities for information associated with the automated social networking television profile configuration and processing described. For example, automatically configured profiles and related profile information may be stored within the profile database 216. Other information may also be stored within the profile database 216 as suitable for a given implementation.

A profile controller 218 is illustrated and provides content monitoring, profile configuration, and social networking opportunity management capabilities within the web access TV 102. Processing associated with the profile controller 218 will be described in more detail below beginning with FIG. 3.

It should be noted that the profile controller 218 and the content interface module 206 are illustrated as componentlevel modules for ease of illustration and description purposes. It is also understood that the profile controller 218 and the content interface module 206 include any hardware, programmed processor(s), and memory used to carry out the respective functions of the profile controller 218 and the content interface module 206 as described above and in more detail below (including programmed operations carried out using processor 200). For example, the profile controller 218 and the content interface module 206 may include additional controller circuitry in the form of application specific integrated circuits (ASICs), processors, and/or discrete integrated circuits and components for performing electrical control activities associated with the profile controller 218 and the content interface module 206. Additionally, the profile controller 218 and the content interface module 206 may also include interrupt-level, stack-level, and application-level modules as appropriate. Furthermore, the profile controller 218 and the content interface module 206 may include any memory components used for storage, execution, and data processing by these modules for performing processing activities associated with the profile controller 218 and the content interface module 206. The profile controller 218 and the content interface module 206 may also form a portion of other circuitry described below without departure from the scope of the present subject matter.

It should also be noted that the profile controller 218 may alternatively be implemented as an application stored within the memory 202. In such an implementation, the profile controller 218 may include instructions executed by the processor 200 for performing the functionality described herein. The processor 200 may execute these instructions to provide the processing capabilities described above and in more detail below for the web access TV 102. The profile controller 218 may form a portion of an interrupt service routine (ISR), a portion of an operating system, a portion of a browser application, or a portion of a separate application without departure from the scope of the present subject matter.

A timer 220 provides timing and time keeping capabilities for the web access TV 102. The timer 220 may be utilized by the profile controller 218, for example, to determine whether a time period and/or date is associated with an access to a stored web access TV user profile, or is associated with access to an item of content.

An audio output 222 provides audio output control for the web access TV 102. The audio output 222 may include appropriate drive circuitry for speakers and other circuitry. However, it is noted that the audio output 222 may include speakers in a given implementation without departure from the scope of the present subject matter.

An input interface 224 provides input capabilities for the user. The input interface 224 may include infra red (IR) circuitry for receiving input signals from a remote control device (not shown). The input interface 224 may also include wireless input interface circuitry. For example, radio frequency (RF) remote control signals or other signals, such as Bluetooth and other circuitry, for receiving user input information as appropriate for a given implementation may also be included. The input interface 224 may also include input circuitry for detecting inputs via a mouse, pen, trackball, keyboard, or other input device. The input interface 224 may include input circuitry sufficient to allow one or more input devices to be used and may include directly hard-wired interface components such as switches and other controls.

A camera 226 provides image capture capabilities for the web access TV 102. Images captured by the camera 226 may be processed, for example, by the input interface 224 or passed directly to the profile controller 218 for facial and/or voice recognition. Facial and/or voice recognition, along with other biometric and/or password information, may be used for profile configuration, selection, verification of change request, and for other purposes.

It is also understood that, where more than one person is identified in association with a web access TV user profile, a default or generic (e.g., family) web access TV user profile may be selected and accessed. Users may further logon to a given profile using their respective biometric, password, or other information. When a default or generic web access TV user profile is active, the web access TV 102 may be configured to prevent display of private information associated with a particular web access TV user profile. For example, individually-configured social networking profile configurations and information associated with a particular web access TV user profile may be maintained as private information and not displayed while a default or generic web access TV user profile is active. Accordingly, email for an individual user, social networking web sites configured for a particular user, and other personal information may be maintained in private. These default characteristics of default or generic web access TV user profiles may be over-ridden by a user, via use of additional biometric and/or password authentication processing.

The processor 200, the memory 202, the content interface module 206, the tuner/decoder module 208, the profile database 216, the profile controller 218, the timer 220, the audio output 222, the input interface 224, and the camera 226 are interconnected within the web access TV 102 via an interconnection 228. The interconnection 228 may include any form of interconnection suitable for a given implementation. For example, the interconnection 228 may include a system bus, a network, or any other interconnection capable of providing the respective components with suitable interconnection for the respective purposes.

While the web access TV 102 is illustrated with and has certain components described, other modules and components may be associated with the web access TV 102. Additionally, it should be noted that, while the web access TV 102 is described as a single device for ease of illustration purposes, the components within the web access TV 102 may alternatively be distributed and interconnected via a network, such as a home network. Many arrangements are possible for components of the web access TV 102 and all are considered within the scope of the present subject matter. It should also be understood that, though the profile database 216 is shown as a separate component, the information stored within the profile database 216 may be stored within the memory 202 without departure from the scope of the present subject matter. Accordingly, the web access TV 102 may take many forms.

FIG. 3 through FIG. 7 described below provide example processes that may be executed by devices, such as the web access TV 102, to perform the automated social networking television profile configuration and processing described herein. Many other variations on the example processes are possible and all are considered within the scope of the present subject matter. The example processes may be performed by modules, such as the profile controller 218 and/or executed by the processor 200. It should be noted that time out procedures and other error control procedures are not illustrated within the example processes described below for ease of illustration purposes. However, it is understood that all such procedures are considered to be within the scope of the present subject matter. Further, certain portions of the processes described below indicate that certain input requests are detected via an input device generally for ease of illustration purposes. However, it is understood that any such detection of an input request may be detected via an input interface component, such as the input interface 224. It should also be noted that processing associated with the various example processing below may be combined and modified without departure from the scope of the present subject matter.

Figure 3:
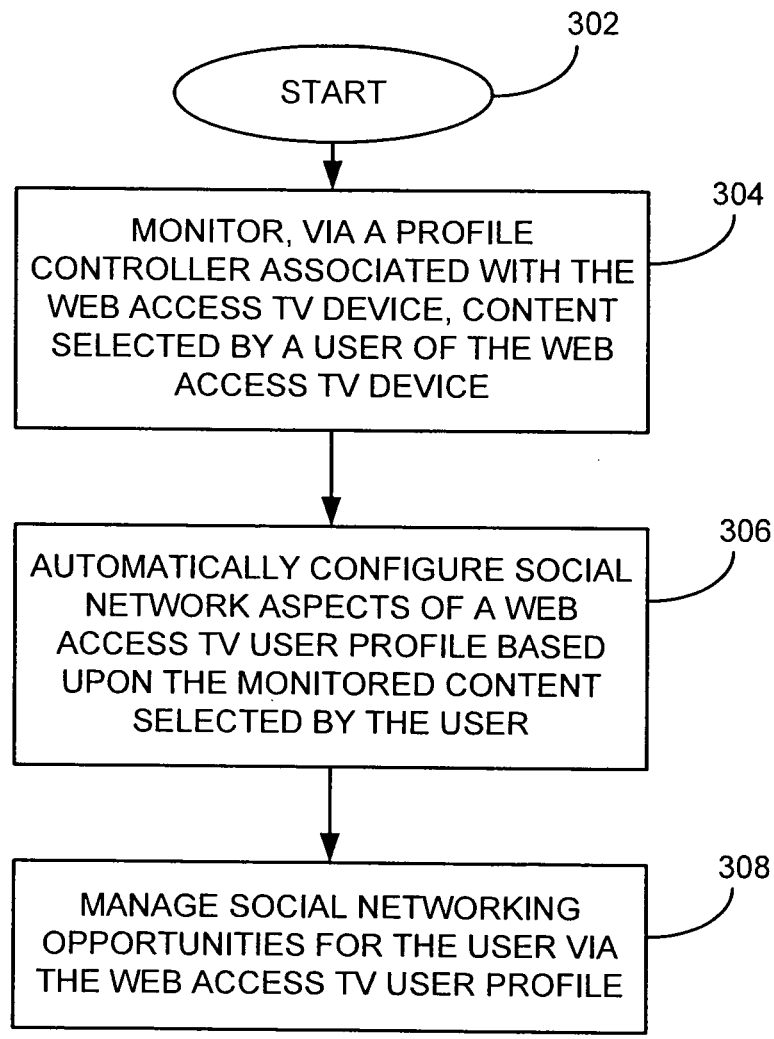
FIG. 3 is a flow chart of an example of an implementation of a process for automated social networking television profile configuration and processing consistent with certain embodiments of the present invention.

FIG. 3 is a flow chart of an example of an implementation of a process 300 for automated social networking television profile configuration and processing. The process 300 begins at 302. At block 304, the process 300 monitors, via a profile controller associated with the web access TV device, content selected by a user of the web access TV device. At block 306, the process 300 automatically configures social network aspects of a web access TV user profile based upon the monitored content selected by the user. At block 308, the process 300 manages social networking opportunities for the user via the web access TV user profile.

Figure 4:
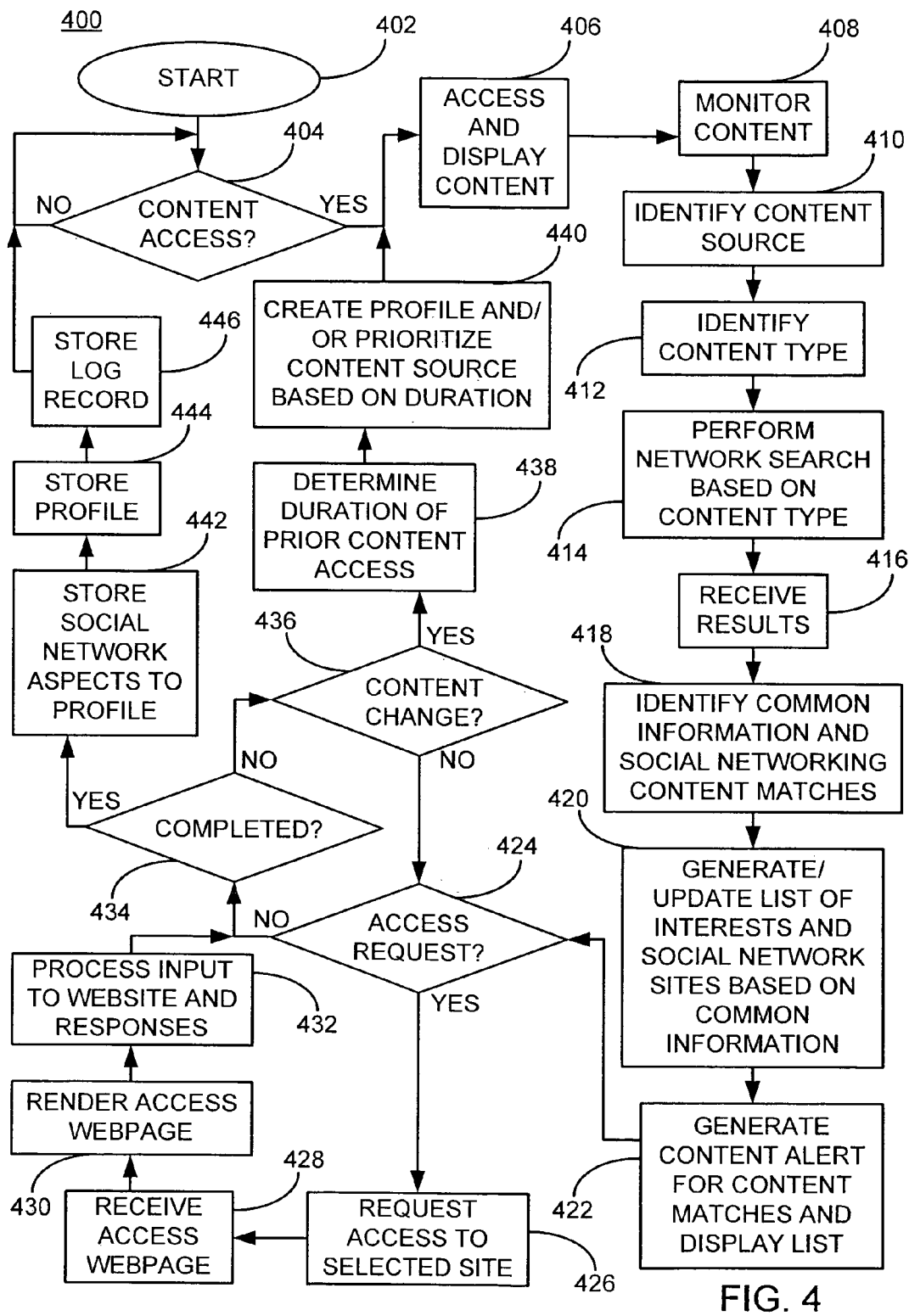
FIG. 4 is a flow chart of an example of an implementation of a process for automated social networking television profile configuration and processing for creation of web access TV user profiles consistent with certain embodiments of the present invention.

FIG. 4 is a flow chart of an example of an implementation of a process 400 for automated social networking television profile configuration and processing for creation of web access TV user profiles. The process 400 begins at 402. At decision point 404, the process 400 determines whether a request to access content has been detected. A request to access content may be associated with a power-on condition for the web access TV 102, a channel or content change associated with web access TV 102, or any other event associated with a content rendering action. As such, for purposes of the present description, the request to access content is associated with content selected by a user of the web access TV 102, for example, via an input device (e.g., a remote control, etc.) associated with the web access TV 102.

When a determination is made that a request to access content has been detected, the process 400 accesses and displays the content via the display 210 at block 406. The content may be received via the tuner/decoder module 208, either as originally decoded by the tuner/decoder module 208 or as forwarded to the tuner/decoder module 208 via the content interface module 206, as described above. As also discussed above, this additional processing to display content via the display 210 is described for reference purposes.

At block 408, the process 400 monitors content selected by a user of the web access TV 102. At block 410, the process 400 identifies a content source associated with the item of content select by the user. At block 412, the process 400 identifies a content type associated with the item of content. For example, for each item of content selected by the user, the process 400 may identify each item of content as a content type selected from a group including network-accessible content, subscribed content, broadcast content, or other content type based upon the type of content selected and accessed.

At block 414, the process 400 performs a network search based upon the content type. For example, the process 400 may perform an Internet search for a topic, a genre, a program rating, and/or a creation date associated with each item of the monitored content selected by the user. The process 400 may also perform an Internet search for available social network websites with content interest groups similar to the monitored content selected by the user.

At block 416, the process 400 receives search results in response to the search. For example, the search results may include one or more of the topic, the genre, the program rating, and the creation date associated with each item of the monitored content selected by the user. The search results may also include available social network websites with content interest groups similar to the monitored content selected by the user.

At block 418, the process 400 identifies common information and/or social network content sources that match the selected content items within items received via the search results. At block 420, the process 400 generates a list of interests and social network sites based upon the common information. For example, the list of interests may be based upon the topic, genre, program rating, and creation date associated with each item of the monitored content selected by the user. For subsequent iterations of processing, the process 400 may update a previously generated list. Additionally, the list of interests may be based upon the common information identified within social networking sites identified during the search. At block 422, the process 400 generates an alert via an output device associated with the web access TV 102, such as the audio output 222, indicating that matching common information and/or social networking content sources that match the selected content items exist, and displays the list to the user, such as via the display 210 or other output device.

At decision point 424, the process 400 makes a determination as to whether a content access request has been detected, such as via an input device associated with the input interface 224. When a determination is made that a content access request has been detected, the process 400 requests access to the selected site, such as a site that includes information associated with the common information and/or a social network website, from a server associated with the selected item at block 426.

At block 428, the process 400 receives an access webpage, such as a home page or other page within which the identified content is found, from the server. At block 430, the process 400 renders the access webpage via the web access TV 102, such as via the display 210. At block 432, the process 400 processes any input received from the user via an input device and any responses generated by the server hosting the web site. For ease of description, iterative processing associated with block 432 is not illustrated. However it is understood that the user may interact with the original accessed web site or any web sites accessed via links from the received access webpage.

When the iterative interaction with the website content is completed, or when a determination is made at decision point 424 that an access request has not been detected, the process 400 makes a determination at decision point 434 as to whether profile processing is completed. The determination as to whether profile processing has been completed may be made in response to detection of a request to power down the web access TV 102 or other event, such as detection of a user request via an input device to terminate profiles processing, or any other event appropriate for a given implementation.

When a determination is made at decision point 434 that processing is not completed, the process 400 makes a determination at decision point 436 as to whether a content change request has been detected. A content change request may include, for example, a request to tune to a different channel associated with a broadcast server, such as the content broadcaster 110, or any other content change request that is detected. When a determination is made at decision point 436 that a content change request has not been detected, the process 400 returns to decision point 424 to continue processing as described above. Accordingly, the process 400 may iterate between decision points 424, 434, and 436 as appropriate for a given implementation and in response to detected user inputs.

When a determination is made at decision point 436 that a content change request has been detected, the process 400 determines a duration of content access associated with the previously-accessed item of content at block 438. The determination of duration may include or may exclude time associated with content access as described above beginning with decision point 424, as appropriate for a given implementation.

While the present example utilizes duration of content access for the processing described, it is understood that other factors may be used in addition to or as an alternative to the duration of content access. For example, access to a merchandizing web site coupled with an actual purchased may be used to identify the merchandizing web site as a preferred site over a different web site where no purchase is made. Additionally, a number of interactions with a particular content provider, such as an informational or merchandizing web site, may be used to identify that particular content provider as a preferred site over a different site with a fewer number of interactions. Many other factors are possible for use with the processing described herein and all are considered within the scope of the present subject matter.

At block 440, the process 400 creates and/or prioritizes the content sources within a web access TV user profile based upon a duration of content access for each content source. Creation of a web access TV user profile may be performed in association with the first iteration of processing at block 440. Subsequent iteration of the process 400 to arrive at block 440 may begin prioritization activities for access to the selected items of accessed content. The process 400 returns to block 406 to iterate as described above.

Returning to the description of decision point 434, when a determination is made that processing is completed, the process 400 stores any identified social networking aspects to the created web access TV user profile at block 442. At block 444, the process 400 stores the web access TV user profile including the automatically configured social network aspects. The process 400 may store the web access TV user profile to local storage, such as within the profile database 216 or the memory 202. The process 400 may also or may alternatively store the web access TV user profile to a server, such as one or more of the server_1 106 through the server_N 108. As described above, when stored to such a server, the user may access the stored profile via any computing device with access to the respective server.

At block 446, the process 400 stores a log record comprising an access time, a duration, and a content identifier associated with access to each item of content selected by the user during the content access session. The log record may be stored to local storage, such as the profile database 216 or the memory 202, or to one or more of the server_1 106 through the server_N 108. The process 400 returns to decision point 404 to await another content access request.

As such, the process 400 provides automated social networking television profile configuration and processing. The process 400 also allows a user to request access to items of content and/or social networking opportunities that are automatically identified as being associated with the user's interests. The process 400 prioritizes (e.g., ranks) content selections based upon, for example, a duration of access to items of content. The process 400 also creates and stores, either locally or on a server, web access TV user profiles and log records based upon accessed content.

Figure 5:
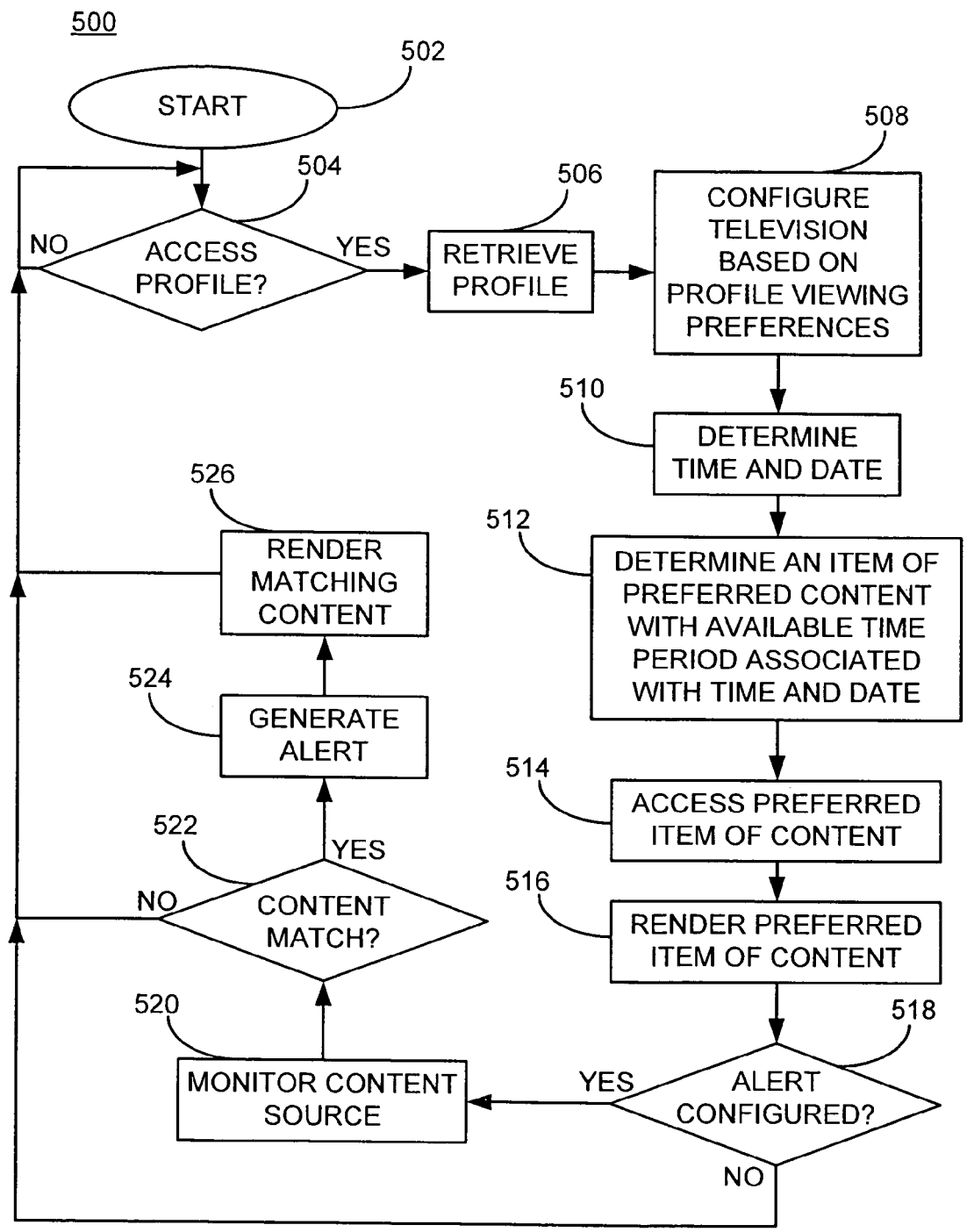
FIG. 5 is a flow chart of an example of an implementation of a process for automated social networking television profile configuration and processing associated with a previously created web access TV user profile consistent with certain embodiments of the present invention.

FIG. 5 is a flow chart of an example of an implementation of a process 500 for automated social networking television profile configuration and processing associated with a previously created web access TV user profile. The process 500 begins at 502. At decision point 504, the process 500 determines whether a request to access a web access TV user profile has been detected. A request to access a web access TV user profile may be associated with a power-on condition for the web access TV 102 in association with automated detection of the user (such as via biometric and/or password identification), a web access TV user profile selection request, or any other event associated with a web access TV user profile selection.

When a determination is made at decision point 504 that a request to access a web access TV user profile has been detected, the process 500 retrieves the requested (or automatically identified) profile from storage at block 506. The retrieval from storage may include a retrieval from local storage, such as the profile database 216 or the memory 202, or from one or more of the server_1 106 through the server_N 108. In the case of retrieval from a server, the process 500 may send a message to the server requesting the web access TV user profile and receive the web access TV user profile from the server.

At block 508, the process 500 configures viewing preferences for the web access TV 102 based upon the received web access TV user profile, such as volume and other viewing preferences. At block 510, the process 500 determines a time and date, such as for example from the timer 220, associated with the access to the web access TV user profile. The process 500 may alternatively determine the time and date from the content source associated with an item of content selected, as discussed in more detail below.

At block 512, the process 500 determines an item of preferred content with an available time period associated with the determined time and date based upon the content viewing preferences. At block 514, the process 500 automatically accesses, via the web access TV 102, the item of preferred content. Automatically accessing the preferred content during the available time period may include tuning a television receiver, such as the tuner/decoder module 208, to a content source associated with the preferred content. Alternatively, automatically accessing the preferred content during the available time period may include downloading the preferred content from a server, such as one of the server_1 106 through the server_N 108. At block 516, the process 500 renders the item of preferred content via the web access TV 102, such as via the display 210.

At decision point 518, the process 500 makes a determination as to whether an alert is configured within the retrieved web access TV user profile. For example, the content source may include a stock market price information content source and a configured alert criterion may include a price target criterion.

When a determination is made that an alert is not configured within the retrieved web access TV user profile, the process 500 returns to decision point 504 to await another request to access a stored web access TV user profile. When a determination is made at decision point 518 that an alert is configured within the retrieved web access TV user profile, the process 500 monitors the content source at block 520.

At decision point 522, the process 500 makes a determination as to whether content available via the content source matches the alert criterion. When a determination is made that content available via the content source does not match the alert criterion, the process 500 returns to decision point 504 to await another request to access a stored web access TV user profile. When a determination is made at decision point 522 that content available via the content source matches the alert criterion, the process 500 generates an alert indication via an output device, such as the audio output 222, indicating that the alert criterion has been identified via the content source at block 524. At block 526, the process 500 renders the content determined to match the alert criterion, such as via the display 210 and returns to decision point 504 to await another request to access a stored web access TV user profile. It should be noted that certain portions of the processing associated with the process 500 may be performed via an Internet monitoring widget.

As such, the process 500 retrieves stored web access TV user profiles from either local or remote storage and automatically configures viewing preferences associated with the web access TV user profiles. The process 500 accesses content associated with a time and date during which a web access TV user profile is accessed and monitors content for alert criteria. Many other possibilities exist for web access TV user profile processing and all are considered within the scope of the present subject matter.

Figure 6:
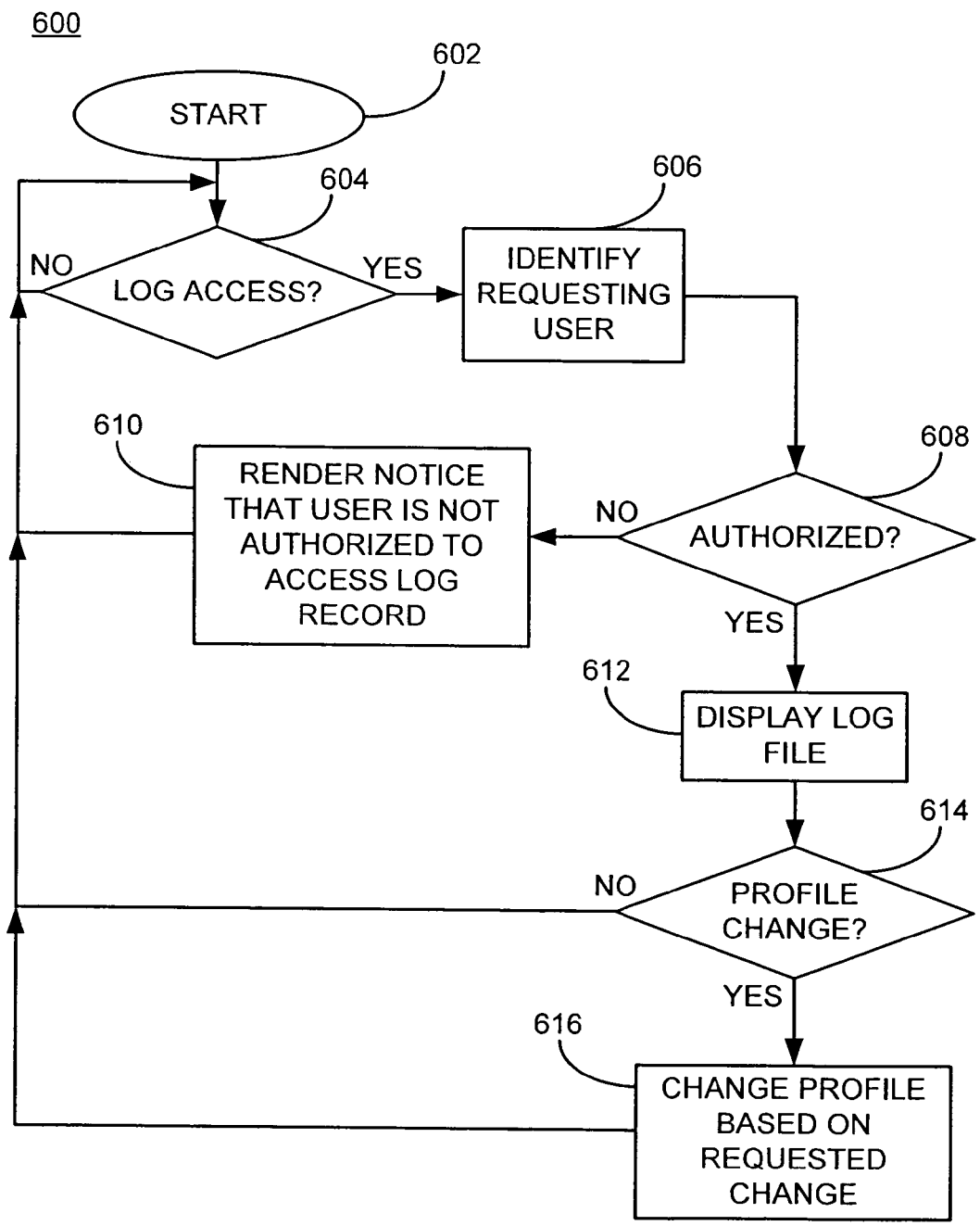
FIG. 6 is a flow chart of an example of an implementation of a process for automated social networking television profile configuration and processing associated with parental controls and log record processing consistent with certain embodiments of the present invention.

FIG. 6 is a flow chart of an example of an implementation of a process 600 for automated social networking television profile configuration and processing associated with parental controls and log record processing. The process 600 begins at 602. At decision point 604, the process 600 determines whether a request to access a stored log record has been detected. A request to access a stored log record may, for example, be associated with a parent or guardian requesting access to the log record via an input device (e.g., a remote control).

When a determination is made that a request to access a stored log record has been detected, the process 600 identifies the requesting user at block 606. The identification of the requesting user may be performed by automatically identifying the user via biometric information, such as facial and/or voice recognition or other biometric information, associated with the user. For example, the camera 226 may be used to capture an image of the requesting user and facial recognition may be performed to identify the requesting user. Alternatively or additionally, the process 600 may request and process a password or other information to identify the user. The identifying information for the user may be used to login to a profile associated with the respective user.

It is also understood that, while the present example is directed to parental controls and log record processing and utilizes identification of one person for ease of illustration, this should not be considered limiting. As discussed above, where more than one person is identified in association with a web access TV user profile, a default or generic (e.g., family) web access TV user profile may be selected and accessed. Users may further logon to a given profile using their respective biometric, password, or other information. When a default or generic web access TV user profile is active, the web access TV 102 may be configured to prevent display of private information associated with a particular web access TV user profile. For example, individually-configured social networking profile configurations and information associated with a particular web access TV user profile may be maintained as private information and not displayed while a default or generic web access TV user profile is active. Accordingly, email for an individual user, social networking web sites configured for a particular user, and other personal information may be maintained in private. These default characteristics of default or generic web access TV user profiles may be over-ridden by a user, via use of additional biometric and/or password authentication processing.

Returning to the description of FIG. 6, at decision point 608, the process 600 makes a determination as to whether the requesting user is authorized to access and view the log record, such as by comparison of the identification information (e.g., identity and any password(s)) with authorization information associated with a configured web access TV user profile associated with the log record.

When a determination is made that the requesting user is not authorized to access the log record, the process 600 renders a notice that the user is not authorized to access the log record at block 610, and the process 600 returns to decision point 604 to await another request to access a log record. When a determination is made that the requesting user is authorized to access the log record, the process 600 displays the log record via the web access TV 102, such as via the display 210, at block 612.

At decision point 614, the process 600 makes a determination as to whether a request originated by the authorized identified user (e.g., a guardian) to change the web access TV user profile has been detected, such as via an input device. As described above, timeout and other processing are omitted for ease of illustration purposes. When a determination is made that a request to change the web access TV user profile has not been detected, the process 600 returns to decision point 604 to await another request to access a log record.

When a determination is made at decision point 614 that a request to change the web access TV user profile has been detected, the process 600 changes the user web access TV user profile based upon the request to change the web access TV user profile at block 616. As described above, the request originated by the guardian may include a request to limit access to content via the web access TV 102 for the user (e.g., a child). The request originated by the guardian may also include a request to block access to content during at least one of a configured time period and a configured date. As such, upon completion of the requested change to the web access TV user profile, the web access TV 102 manages the social networking opportunities for the user based upon the changed web access TV user profile, such as by blocking access by the user to the content during the configured time period and the configured date. Upon completion of processing to change the web access TV user profile, the process 600 returns to decision point 604 to await another request to access a log record.

As such, the process 600 provides automated social networking television profile configuration and processing associated with parental controls and log record processing. A requesting user is identified and a determination is made as to whether the requesting user is authorized to make changes to the web access TV user profile. Web access TV user profiles may be changed based upon parental controls that the parent/guardian request.

Figure 7:
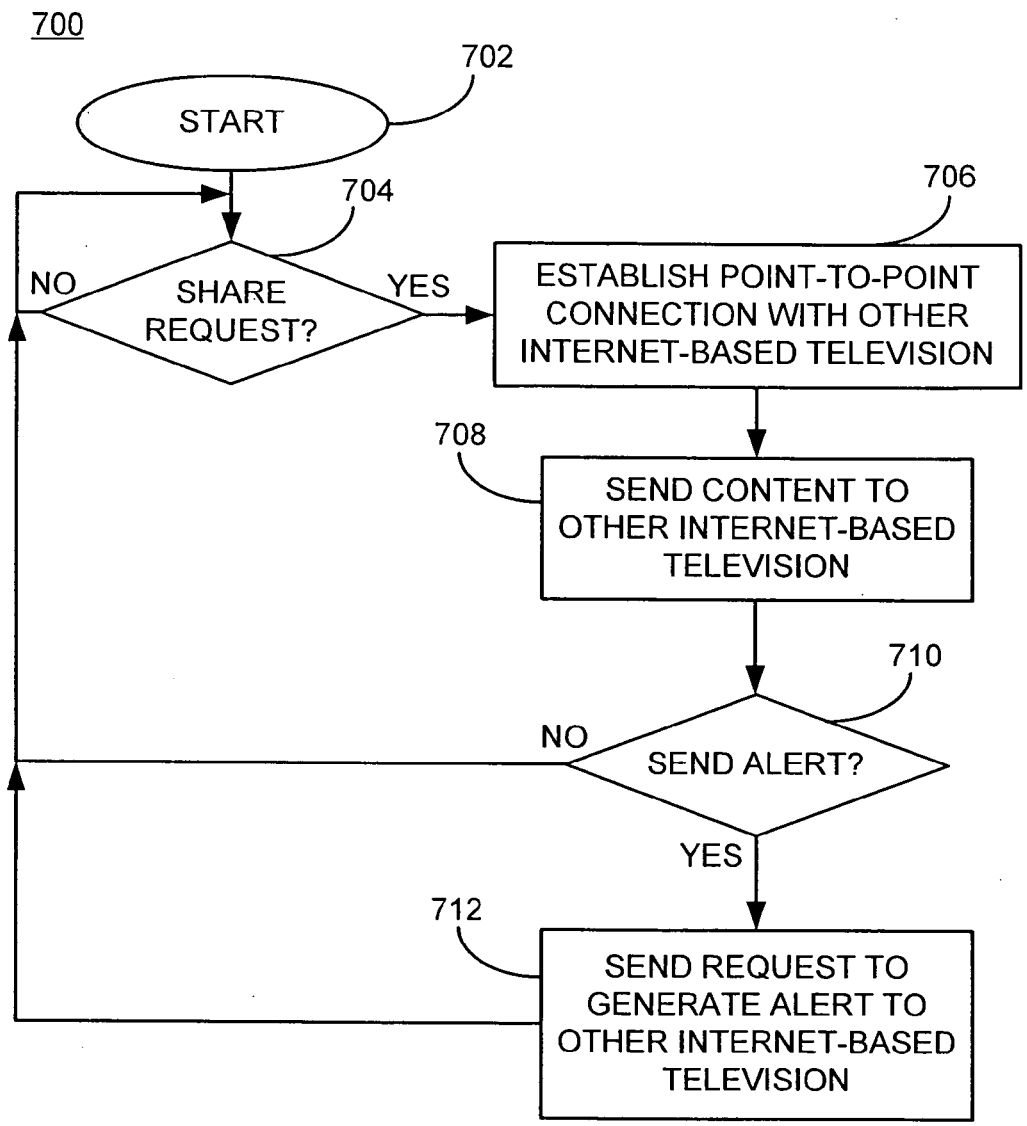
FIG. 7 is a flow chart of an example of an implementation of a process for automated social networking television profile configuration and processing associated with point-to-point connectivity and content sharing consistent with certain embodiments of the present invention.

FIG. 7 is a flow chart of an example of an implementation of a process 700 for automated social networking television profile configuration and processing associated with point-to-point connectivity and content sharing. The process 700 begins at 702. At decision point 704, the process 700 determines whether a request to share an item of the content selected by the user via a point-to-point connection with another web access TV device has been detected. A request to share content may be received, for example, via an input device (e.g., a remote control) associated with the web access TV 102. When a determination is made that a request to share content has been detected, the process 700 establishes a point-to-point connection, via a communication device such as the content interface module 206, with another web access TV device, such as the web access TV 112, at block 706. At block 708, the process 700 sends one of an identifier associated with the item of the content selected by the user and the item of the content selected by the user to the other web access TV device via the communication device.

At decision point 710, the process 700 makes a determination as to whether the request to share an item of the content selected by the user via a point-to-point connection with another web access TV device includes a request to send an alert to the other web access TV device. When a determination is made that the request to share an item of content does not include a request to send an alert to the other web access TV device, the process 700 returns to decision point 704 to await another request to share content. When a determination is made at decision point 710 that the request to share an item of content selected by the user includes a request to send an alert to the other web access TV device, the process 700 sends a request to the other web access TV device to generate the alert via the other web access TV device for the user of the other web access TV device at block 712. The process 700 returns to decision point 704 to await another request to share content.

As such, the process 700 provides automated social networking television profile configuration and processing associated with point-to-point connectivity and content sharing. The process 700 establishes point-to-point connections with remote web access TVs or other computing devices. The process 700 also requests alerts to users of the other computing devices based upon requests detected from a user. Many other variations on the processing described are possible and all are considered within the scope of the present subject matter.

Based upon the foregoing description, the present subject matter provides automated social networking television profile configuration and processing. A web access television (TV) device processes content selections by monitoring and performing network searches to identify information associated with the selected content, such as a content type. A list of interests of the user may be automatically generated based upon at least one of a topic, a genre, a program rating, and a creation date associated with each item of the monitored content selected by the user. Social network opportunities may be automatically identified for the user based upon a web access TV user profile, created and configured based upon the monitored content selections and associated information.

Thus, in accord with certain implementations, a method of managing social networking via a web access television (TV) device involves monitoring, via a profile controller associated with the web access TV device, content selected by a user of the web access TV device; automatically configuring social network aspects of a web access TV user profile based upon the monitored content selected by the user; and managing social networking opportunities for the user via the web access TV user profile.

In certain implementations of the method of managing social networking via a web access television (TV) device, monitoring, via the web access TV device, the content selected by the user of the web access TV device involves identifying each item of the content selected by the user as one of a plurality of content types selected from a group consisting of network-accessible content, subscribed content, and broadcast content; and identifying a content source associated with each item of content selected by the user. In certain implementations, the method of automatically configuring the social network aspects of the web access TV user profile based upon the monitored content selected by the user involves prioritizing the content sources within the web access TV user profile based upon a duration of content access for each content source. In certain implementations, the method of automatically configuring the social network aspects of the web access TV user profile based upon the monitored content selected by the user involves automatically generating a list of interests of the user based upon at least one of a topic, a genre, a program rating, and a creation date associated with each item of the monitored content selected by the user. In certain implementations, the method of automatically generating the list of interests of the user based upon the at least one of the topic, the genre, the program rating, and the creation date associated with each item of the monitored content selected by the user involves performing a network search for the at least one of the topic, the genre, the program rating, and the creation date associated with each item of the monitored content selected by the user; receiving search results including the at least one of the topic, the genre, the program rating, and the creation date associated with each item of the monitored content selected by the user; identifying common information within items received via the search results; and associating the identified common information with the web access TV user profile as the list of interests of the user. In certain implementations, the method of automatically configuring the social network aspects of the web access TV user profile based upon the monitored content selected by the user involves performing a network search for available social network websites with content interest groups similar to the monitored content selected by the user; receiving search results including the available social network websites with the content interest groups similar to the monitored content selected by the user; automatically generating a list of the available social network websites with the content interest groups similar to the monitored content selected by the user; and associating the generated list of the available social network websites with the content interest groups similar to the monitored content selected by the user with the web access TV user profile. In certain implementations, the method of managing the social networking opportunities for the user via the web access TV user profile involves displaying the generated list of the available social network websites to the user via the web access TV device; detecting a request via an input device to access a selected one of the available social network websites; requesting access to the selected social network website from a server associated with the selected social network website; receiving an access webpage from the server; and rendering the access webpage via the web access TV device. In certain implementations, the method of managing the social networking opportunities for the user via the web access TV user profile involves identifying a social networking content source that matches at least one of the automatically configured social network aspects for the web access TV user profile; and generating an alert via an output device indicating that the matching social networking content source exists. In certain implementations, the method of managing social networking via a web access television (TV) device further involves detecting a request, via an input device, to access the matching social networking content source; accessing the matching social networking content source; and rendering content associated with the matching social networking content source via the web access TV device. In certain implementations, the method of managing social networking via a web access television (TV) device further involves storing the web access TV user profile with the automatically configured social network aspects on a server. In certain implementations, the method of managing social networking via a web access television (TV) device further involves detecting a request via a user input device to access the web access TV user profile stored on the server; sending a message to the server requesting the web access TV user profile; receiving the web access TV user profile from the server; and configuring viewing preferences for the web access TV device based upon the received web access TV user profile. In certain implementations, where the web access TV user profile includes content viewing preferences with associated available time periods for access to items of preferred content, the method further involves determining, in response to activation of the web access TV user profile via the web access TV device, a time and date associated with an access to the web access TV user profile; determining an item of preferred content with an available time period associated with the determined time and date based upon the content viewing preferences; automatically accessing, via the web access TV device, the item of preferred content during the available time period; and rendering the item of preferred content via the web access TV device. In certain implementations, the method of automatically accessing, via the web access TV device, the item of preferred content during the available time period involves one of tuning a television receiver to a content source associated with the item of preferred content, and downloading the item of preferred content from a server. In certain implementations, the of managing social networking via a web access television (TV) device further involves storing a log record including an access time, a duration, and a content identifier associated with access to each item of content selected by the user. In certain implementations, the method further involves detecting a request, via an input device, originated by a guardian of the user to view the log record; verifying the guardian is authorized to view the log record; and displaying the log record via the web access TV device. In certain implementations, the method further involves detecting a request, via the input device, originated by the guardian to change the web access TV user profile; changing the user web access TV user profile based upon the request by the guardian to change the web access TV user profile; and managing the social networking opportunities for the user via the web access TV user profile involves managing the social networking opportunities for the user based upon the changed web access TV user profile. In certain implementations of the method, the request originated by the guardian includes a request to limit access by the user to content via the web access TV device. In certain implementations of the method, the request to limit the access by the user to the content via the web access TV device includes a request to block access to the content during at least one of a configured time period and a configured date; and managing the social networking opportunities for the user via the web access TV user profile includes blocking access by the user to the content during the at least one of the configured time period and the configured date. In certain implementations, the method further involves detecting a request, via an input device, to share an item of the content selected by the user via a point-to-point connection with another web access TV device; establishing the point-to-point connection, via a communication device, with the other web access TV device; and sending one of an identifier associated with the item of the content selected by the user and the item of the content selected by the user to the other web access TV device via the communication device. In certain implementations of the method, the request to share the item of the content includes a request to send an alert to the other web access TV device; and the method further involves sending the request to the other web access TV device to generate the alert via the other web access TV device. In certain implementations, the method further involves detecting a request, via an input device, to associate an alert with a content source and adding an alert criterion associated with the content source to the web access TV user profile. In certain implementations of the method, the content source includes a stock market price information content source and the alert criterion includes a price target criterion. In certain implementations, the method further involves monitoring the content source associated with the alert criterion; determining that content available via the content source matches the alert criterion; generating an alert indication via an output device indicating that the alert criterion has been identified via the content source; and rendering the content determined to match the alert criterion. In certain implementations, determining that the content available via the content source matches the alert criterion is performed via an Internet monitoring widget.

In another implementation, a computer readable storage medium may store instructions which, when executed on one or more programmed processors, carry out a process of monitoring, via a profile controller associated with the web access TV device, content selected by a user of the web access TV device; automatically configuring social network aspects of a web access TV user profile based upon the monitored content selected by the user; and managing social networking opportunities for the user via the web access TV user profile.

A web access television (TV) device consistent with certain implementations has a display device having a display including a display area; a memory for storing profile information; a tuner/decoder device that receives video content that is displayed via the display of the display device; and a profile controller configured to: monitor content selected by a user; automatically configure social network aspects of a web access TV user profile based upon the monitored content selected by the user; and manage social networking opportunities for the user via the web access TV user profile. In certain implementations, in being configured to monitor the content selected by the user, the profile controller is configured to identify each item of the content selected by the user as one of a plurality of content types selected from a group consisting of network-accessible content, subscribed content, and broadcast content; and identify a content source associated with each item of content selected by the user. In certain implementations, in being configured to automatically configure the social network aspects of the web access TV user profile based upon the monitored content selected by the user, the profile controller is configured to prioritize the content sources within the web access TV user profile based upon a duration of content access for each content source. In certain implementations, in being configured to automatically configure the social network aspects of the web access TV user profile based upon the monitored content selected by the user, the profiled controller is configured to automatically generate a list of interests of the user based upon at least one of a topic, a genre, a program rating, and a creation date associated with each item of the monitored content selected by the user. In certain implementations, in being configured to automatically generate the list of interests of the user based upon the at least one of the topic, the genre, the program rating, and the creation date associated with each item of the monitored content selected by the user, the profiled controller is configured to: perform a network search for the at least one of the topic, the genre, the program rating, and the creation date associated with each item of the monitored content selected by the user; receive search results including the at least one of the topic, the genre, the program rating, and the creation date associated with each item of the monitored content selected by the user; identify common information within items received via the search results; and associate the identified common information with the web access TV user profile as the list of interests of the user. In certain implementations, in being configured to automatically configure the social network aspects of the web access TV user profile based upon the monitored content selected by the user, the profiled controller is configured to: perform a network search for available social network websites with content interest groups similar to the monitored content selected by the user; receive search results including the available social network websites with the content interest groups similar to the monitored content selected by the user; automatically generate a list of the available social network websites with the content interest groups similar to the monitored content selected by the user; and associate the generated list of the available social network websites with the content interest groups similar to the monitored content selected by the user with the web access TV user profile. In certain implementations, the web access TV device further includes an input device for receiving user input; and where, in being configured to manage the social networking opportunities for the user via the web access TV user profile, the profiled controller is configured to: display the generated list of the available social network websites to the user via the display device; detect a request via the input device to access a selected one of the available social network websites; request access to the selected social network website from a server associated with the selected social network website; receive an access webpage from the server; and render the access webpage via the display device. In certain implementations, web access TV device further includes an output device; and where, in being configured to manage the social networking opportunities for the user via the web access TV user profile, the profiled controller is configured to: identify a social networking content source that matches at least one of the automatically configured social network aspects for the web access TV user profile; and generate an alert via the output device indicating that the matching social networking content source exists. In certain implementations, the web access TV device further includes an input device for receiving user input; and the profile controller is further configured to: detect a request, via the input device, to access the matching social networking content source; access the matching social networking content source; and render content associated with the matching social networking content source via the display device. In certain implementations, the profile controller is further configured to store the web access TV user profile with the automatically configured social network aspects on a server. In certain implementations, the web access TV device further includes an input device for receiving user input; and the profile controller is further configured to: detect a request via the user input device to access the web access TV user profile stored on the server; send a message to the server requesting the web access TV user profile; receive the web access TV user profile from the server; and configure viewing preferences based upon the received web access TV user profile. In certain implementations, the web access TV user profile includes content viewing preferences with associated available time periods for access to items of preferred content, and the profile controller is further configured to: determine, in response to activation of the web access TV user profile, a time and date associated with an access to the web access TV user profile; determine an item of preferred content with an available time period associated with the determined time and date based upon the content viewing preferences; automatically access the item of preferred content during the available time period; and render the item of preferred content via the display device. In certain implementations, in being configured to automatically access the item of preferred content during the available time period, the profiled controller is configured to one of: tune a television receiver to a content source associated with the item of preferred content; and download the item of preferred content from a server. In certain implementations, the profile controller is further configured to store a log record including an access time, a duration, and a content identifier associated with access to each item of content selected by the user. In certain implementations, the web access TV device further includes an input device for receiving user input; and the profile controller is further configured to: detect a request, via the input device, originated by a guardian of the user to view the log record; verify the guardian is authorized to view the log record; and display the log record via the display device. In certain implementations, the profile controller is further configured to: detect a request, via the input device, originated by the guardian to change the web access TV user profile; change the user web access TV user profile based upon the request by the guardian to change the web access TV user profile; and in being configured to manage the social networking opportunities for the user via the web access TV user profile, the profile controller is configured to manage the social networking opportunities for the user based upon the changed web access TV user profile. In certain implementations, the request originated by the guardian includes a request to limit access by the user to content. In certain implementations, the request to limit the access by the user to the content includes a request to block access to the content during at least one of a configured time period and a configured date; and in being configured to manage the social networking opportunities for the user via the web access TV user profile, the profile controller is configured to block access by the user to the content during the at least one of the configured time period and the configured date. In certain implementations, the web access TV device further includes an input device for receiving user input; a communication device; and the profile controller is further configured to: detect a request, via the input device, to share an item of the content selected by the user via a point-to-point connection with another web access TV device; establish the point-to-point connection, via the communication device, with the other web access TV device; and send one of an identifier associated with the item of the content selected by the user and the item of the content selected by the user to the other web access TV device via the communication device. In certain implementations, the request to share the item of the content includes a request to send an alert to the other web access TV device; and the profile controller is configured to send the request to the other web access TV device to generate the alert via the other web access TV device. In certain implementations, the web access TV device further includes an input device for receiving user input; and the profile controller is further configured to detect a request, via the input device, to associate an alert with a content source and add an alert criterion associated with the content source to the web access TV user profile. In certain implementations, the content source includes a stock market price information content source and the alert criterion includes a price target criterion. In certain implementations, the web access TV device further includes an output device; and the profile controller is further configured to: monitor the content source associated with the alert criterion; determine that content available via the content source matches the alert criterion; generate an alert indication via the output device indicating that the alert criterion has been identified via the content source; and render the content determined to match the alert criterion via the display device. In certain implementations, determining that the content available via the content source matches the alert criterion is performed via an Internet monitoring widget. In certain implementations, the web access TV device further includes an Internet monitoring widget, and the Internet monitoring widget determines that the content available via the content source matches the alert criterion.

While certain embodiments herein were described in conjunction with specific circuitry that carries out the functions described, other embodiments are contemplated in which the circuit functions are carried out using equivalent elements executed on one or more programmed processors. General purpose computers, microprocessor based computers, microcontrollers, optical computers, analog computers, dedicated processors, application specific circuits and/or dedicated hard wired logic and analog circuitry may be used to construct alternative equivalent embodiments. Other embodiments could be implemented using hardware component equivalents such as special purpose hardware, dedicated processors or combinations thereof.

Certain embodiments may be implemented using one or more programmed processors executing programming instructions that in certain instances are broadly described above in flow chart form that can be stored on any suitable electronic or computer readable storage medium (such as, for example, disc storage, Read Only Memory (ROM) devices, Random Access Memory (RAM) devices, network memory devices, optical storage elements, magnetic storage elements, magneto-optical storage elements, flash memory, core memory and/or other equivalent volatile and non-volatile storage technologies). However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can be added and/or enhanced and variations can be made in user interface and information presentation without departing from certain embodiments of the present invention. Such variations are contemplated and considered equivalent.

While certain illustrative embodiments have been described, it is evident that many alternatives, modifications, permutations and variations will become apparent to those skilled in the art in light of the foregoing description.

What is claimed is:

1. A method of managing social networking via a web access television (TV) device, comprising:
    monitoring, via a profile controller associated with the web access TV device, content selected by a user of the web access TV device;
    the profile controller automatically configuring social network aspects of a web access TV user profile based upon the monitored content selected by the user;
    the profile controller automatically managing social networking opportunities for the user via the web access TV user profile, where the social networking is carried out between the user of the web access TV device and other users using other web access TV devices, where such web access TV devices are networked together via a global communications network; and
    where automatically configuring the social network aspects of the web access TV user profile based upon the monitored content selected by the user comprises:
        performing a network search for available social network websites with content interest groups similar to the monitored content selected by the user;
        receiving search results comprising the available social network websites with the content interest groups similar to the monitored content selected by the user;
        automatically generating a list of the available social network websites with the content interest groups similar to the monitored content selected by the user; and
        associating the generated list of the available social network websites with the content interest groups similar to the monitored content selected by the user with the web access TV user profile.

2. The method according to claim 1, where monitoring, via the web access TV device, the content selected by the user of the web access TV device comprises:
    identifying each item of the content selected by the user as one of a plurality of content types selected from a group consisting of network-accessible content, subscribed content, and broadcast content; and
    identifying a content source associated with each item of content selected by the user.

3. The method according to claim 2, where automatically configuring the social network aspects of the web access TV user profile based upon the monitored content selected by the user comprises prioritizing the content sources within the web access TV user profile based upon a duration of content access for each content source.

4. The method according to claim 1, where automatically configuring the social network aspects of the web access TV user profile based upon the monitored content selected by the user comprises automatically generating a list of interests of the user based upon at least one of a topic, a genre, a program rating, and a creation date associated with each item of the monitored content selected by the user.

5. The method according to claim 4, where automatically generating the list of interests of the user based upon the at least one of the topic, the genre, the program rating, and the creation date associated with each item of the monitored content selected by the user comprises:
    performing a network search for the at least one of the topic, the genre, the program rating, and the creation date associated with each item of the monitored content selected by the user;
    receiving search results comprising the at least one of the topic, the genre, the program rating, and the creation date associated with each item of the monitored content selected by the user;
    identifying common information within items received via the search results; and
    associating the identified common information with the web access TV user profile as the list of interests of the user.

6. The method according to claim 1, where managing the social networking opportunities for the user via the web access TV user profile comprises:
    displaying the generated list of the available social network websites to the user via the web access TV device;
    detecting a request via an input device to access a selected one of the available social network websites;
    requesting access to the selected social network website from a server associated with the selected social network website;
    receiving an access webpage from the server; and
    rendering the access webpage via the web access TV device.

7. The method according to claim 1, where managing the social networking opportunities for the user via the web access TV user profile comprises:
    identifying a social networking content source that matches at least one of the automatically configured social network aspects for the web access TV user profile; and
    generating an alert via an output device indicating that the matching social networking content source exists.

8. The method according to claim 7, further comprising:
   detecting a request, via an input device, to access the matching social networking content source;
   accessing the matching social networking content source; and
   rendering content associated with the matching social networking content source via the web access TV device.
9. The method according to claim 1, further comprising storing the web access TV user profile with the automatically configured social network aspects on a server.
10. The method according to claim 9, further comprising:
    detecting a request via a user input device to access the web access TV user profile stored on the server;
    sending a message to the server requesting the web access TV user profile;
    receiving the web access TV user profile from the server; and
    configuring viewing preferences for the web access TV device based upon the received web access TV user profile.
11. The method according to claim 1, where the web access TV user profile comprises content viewing preferences with associated available time periods for access to items of preferred content, and further comprising:
    determining, in response to activation of the web access TV user profile via the web access TV device, a time and date associated with an access to the web access TV user profile;
    determining an item of preferred content with an available time period associated with the determined time and date based upon the content viewing preferences;
    automatically accessing, via the web access TV device, the item of preferred content during the available time period; and
    rendering the item of preferred content via the web access TV device.
12. The method according to claim 11, where automatically accessing, via the web access TV device, the item of preferred content during the available time period comprises one of tuning a television receiver to a content source associated with the item of preferred content, and downloading the item of preferred content from a server.
13. The method according to claim 1, further comprising storing a log record comprising an access time, a duration, and a content identifier associated with access to each item of content selected by the user.
14. The method according to claim 13, further comprising:
    detecting a request, via an input device, originated by a guardian of the user to view the log record;
    verifying the guardian is authorized to view the log record; and
    displaying the log record via the web access TV device.
15. The method according to claim 14, further comprising:
    detecting a request, via the input device, originated by the guardian to change the web access TV user profile;
    changing the user web access TV user profile based upon the request by the guardian to change the web access TV user profile; and
    where managing the social networking opportunities for the user via the web access TV user profile comprises managing the social networking opportunities for the user based upon the changed web access TV user profile.
16. The method according to claim 14, where the request originated by the guardian comprises a request to limit access by the user to content via the web access TV device.

17. The method according to claim 16, where:
    the request to limit the access by the user to the content via the web access TV device comprises a request to block access to the content during at least one of a configured time period and a configured date; and
    managing the social networking opportunities for the user via the web access TV user profile comprises blocking access by the user to the content during the at least one of the configured time period and the configured date.
18. The method according to claim 1, further comprising:
    detecting a request, via an input device, to share an item of the content selected by the user via a point-to-point connection with another web access TV device;
    establishing the point-to-point connection, via a communication device, with the other web access TV device; and
    sending one of an identifier associated with the item of the content selected by the user and the item of the content selected by the user to the other web access TV device via the communication device.
19. The method according to claim 18, where:
    the request to share the item of the content comprises a request to send an alert to the other web access TV device; and
    sending the request to the other web access TV device to generate the alert via the other web access TV device.
20. The method according to claim 1, further comprising detecting a request, via an input device, to associate an alert with a content source and adding an alert criterion associated with the content source to the web access TV user profile.
21. The method according to claim 20, where the content source comprises a stock market price information content source and the alert criterion comprises a price target criterion.
22. The method according to claim 20, further comprising:
    monitoring the content source associated with the alert criterion;
    determining that content available via the content source matches the alert criterion;
    generating an alert indication via an output device indicating that the alert criterion has been identified via the content source; and
    rendering the content determined to match the alert criterion.
23. The method according to claim 22, where determining that the content available via the content source matches the alert criterion is performed via an Internet monitoring widget.
24. A non-transitory computer readable storage medium storing instructions which, when executed on one or more programmed processors, carry out a process according to claim 1.
25. A web access television (TV) device, comprising:
    a display device having a display comprising a display area;
    a memory for storing profile information;
    a tuner/decoder device that receives video content that is displayed via the display of the display device; and
    a profile controller configured to:
      monitor content selected by a user;
      automatically configure social network aspects of a web access TV user profile based upon the monitored content selected by the user; and
      manage social networking opportunities for the user via the web access TV user profile, where the social networking is carried out between the user of the web access TV device and other users using other web access TV devices, where such web access TV devices are networked together via a global communications network;

where, in being configured to automatically configure the social network aspects of the web access TV user profile based upon the monitored content selected by the user, the profile controller is configured to:

perform a network search for available social network websites with content interest groups similar to the monitored content selected by the user;

receive search results comprising the available social network websites with the content interest groups similar to the monitored content selected by the user;

automatically generate a list of the available social network websites with the content interest groups similar to the monitored content selected by the user; and associate the generated list of the available social network websites with the content interest groups similar to the monitored content selected by the user with the web access TV user profile.

26. The web access TV device according to claim 25, where, in being configured to monitor the content selected by the user, the profile controller is configured to:

identify each item of the content selected by the user as one of a plurality of content types selected from a group consisting of network-accessible content, subscribed content, and broadcast content; and identify a content source associated with each item of content selected by the user.

27. The web access TV device according to claim 26, where, in being configured to automatically configure the social network aspects of the web access TV user profile based upon the monitored content selected by the user, the profile controller is configured to prioritize the content sources within the web access TV user profile based upon a duration of content access for each content source.

28. The web access TV device according to claim 25, where, in being configured to automatically configure the social network aspects of the web access TV user profile based upon the monitored content selected by the user, the profiled controller is configured to automatically generate a list of interests of the user based upon at least one of a topic, a genre, a program rating, and a creation date associated with each item of the monitored content selected by the user.

29. The web access TV device according to claim 28, where, in being configured to automatically generate the list of interests of the user based upon the at least one of the topic, the genre, the program rating, and the creation date associated with each item of the monitored content selected by the user, the profiled controller is configured to:

perform a network search for the at least one of the topic, the genre, the program rating, and the creation date associated with each item of the monitored content selected by the user;

receive search results comprising the at least one of the topic, the genre, the program rating, and the creation date associated with each item of the monitored content selected by the user;

identify common information within items received via the search results; and associate the identified common information with the web access TV user profile as the list of interests of the user.

30. The web access TV device according to claim 25, further comprising:

an input device for receiving user input; and where, in being configured to manage the social networking opportunities for the user via the web access TV user profile, the profile controller is configured to:

display the generated list of the available social network websites to the user via the display device;

detect a request via the input device to access a selected one of the available social network websites;

request access to the selected social network website from a server associated with the selected social network website;

receive an access webpage from the server; and render the access webpage via the display device.

31. The web access TV device according to claim 25, further comprising:

an output device; and where, in being configured to manage the social networking opportunities for the user via the web access TV user profile, the profiled controller is configured to:

identify a social networking content source that matches at least one of the automatically configured social network aspects for the web access TV user profile; and generate an alert via the output device indicating that the matching social networking content source exists.

32. The web access TV device according to claim 31, further comprising:

an input device for receiving user input; and where the profile controller is further configured to:

detect a request, via the input device, to access the matching social networking content source;

access the matching social networking content source; and render content associated with the matching social networking content source via the display device.

33. The web access TV device according to claim 25, where the profile controller is further configured to store the web access TV user profile with the automatically configured social network aspects on a server.

34. The web access TV device according to claim 33, further comprising:

an input device for receiving user input; and where the profile controller is further configured to:

detect a request via the user input device to access the web access TV user profile stored on the server;

send a message to the server requesting the web access TV user profile;

receive the web access TV user profile from the server; and configure viewing preferences based upon the received web access TV user profile.

35. The web access TV device according to claim 25, where the web access TV user profile comprises content viewing preferences with associated available time periods for access to items of preferred content, and where the profile controller is further configured to:

determine, in response to activation of the web access TV user profile, a time and date associated with an access to the web access TV user profile;

determine an item of preferred content with an available time period associated with the determined time and date based upon the content viewing preferences;

automatically access the item of preferred content during the available time period; and render the item of preferred content via the display device.

36. The web access TV device according to claim 35, where, in being configured to automatically access the item of preferred content during the available time period, the profiled controller is configured to one of:
tune a television receiver to a content source associated with the item of preferred content; and
download the item of preferred content from a server.

37. The web access TV device according to claim 25, where the profile controller is further configured to store a log record comprising an access time, a duration, and a content identifier associated with access to each item of content selected by the user.

38. The web access TV device according to claim 37, further comprising:
an input device for receiving user input; and
where the profile controller is further configured to:
detect a request, via the input device, originated by a guardian of the user to view the log record;
verify the guardian is authorized to view the log record; and
display the log record via the display device.

39. The web access TV device according to claim 38, where the profile controller is further configured to:
detect a request, via the input device, originated by the guardian to change the web access TV user profile;
change the user web access TV user profile based upon the request by the guardian to change the web access TV user profile; and
where, in being configured to manage the social networking opportunities for the user via the web access TV user profile, the profile controller is configured to manage the social networking opportunities for the user based upon the changed web access TV user profile.

40. The web access TV device according to claim 38, where the request originated by the guardian comprises a request to limit access by the user to content.

41. The web access TV device according to claim 40, where:
the request to limit the access by the user to the content comprises a request to block access to the content during at least one of a configured time period and a configured date; and
where, in being configured to manage the social networking opportunities for the user via the web access TV user profile, the profile controller is configured to block access by the user to the content during the at least one of the configured time period and the configured date.

42. The web access TV device according to claim 25, further comprising:
an input device for receiving user input; and
a communication device; and
where the profile controller is further configured to:
detect a request, via the input device, to share an item of the content selected by the user via a point-to-point connection with another web access TV device;
establish the point-to-point connection, via the communication device, with the other web access TV device; and
send one of an identifier associated with the item of the content selected by the user and the item of the content selected by the user to the other web access TV device via the communication device.

43. The web access TV device according to claim 42, where:
the request to share the item of the content comprises a request to send an alert to the other web access TV device; and
where the profile controller is configured to send the request to the other web access TV device to generate the alert via the other web access TV device.

44. The web access TV device according to claim 25, further comprising:
an input device for receiving user input; and
where the profile controller is further configured to detect a request, via the input device, to associate an alert with a content source and add an alert criterion associated with the content source to the web access TV user profile.

45. The web access TV device according to claim 44, where the content source comprises a stock market price information content source and the alert criterion comprises a price target criterion.

46. The web access TV device according to claim 44, further comprising:
an output device; and
where the profile controller is further configured to:
monitor the content source associated with the alert criterion;
determine that content available via the content source matches the alert criterion;
generate an alert indication via the output device indicating that the alert criterion has been identified via the content source; and
render the content determined to match the alert criterion via the display device.

47. The web access TV device according to claim 43, further comprising an Internet monitoring widget, and where the Internet monitoring widget determines that the content available via the content source matches the alert criterion.

* * * * *